US011906980B2

(12) United States Patent
Barabas et al.

(10) Patent No.: US 11,906,980 B2
(45) Date of Patent: Feb. 20, 2024

(54) SYSTEMS AND METHODS FOR AUTONOMOUS VEHICLE OPERATION

(71) Applicant: 6 RIVER SYSTEMS, LLC, Waltham, MA (US)

(72) Inventors: James Barabas, Concord, MA (US); Andra Adams, Ottawa (CA)

(73) Assignee: 6 RIVER SYSTEMS, LLC, Waltham, MA (US)

( * ) Notice: Subject to any disclaimer, the term of this patent is extended or adjusted under 35 U.S.C. 154(b) by 257 days.

(21) Appl. No.: 16/952,484

(22) Filed: Nov. 19, 2020

(65) Prior Publication Data

US 2022/0155798 A1    May 19, 2022

(51) Int. Cl.
*G05D 1/00* (2006.01)

(52) U.S. Cl.
CPC ......... *G05D 1/0291* (2013.01); *G05D 1/0027* (2013.01); *G05D 1/0088* (2013.01); *G05D 1/0223* (2013.01); *G05D 1/0238* (2013.01)

(58) Field of Classification Search
CPC .. G05D 1/0291; G05D 1/0027; G05D 1/0088; G05D 1/0223; G05D 1/0238
See application file for complete search history.

(56) References Cited

U.S. PATENT DOCUMENTS

| 2018/0029797 A1* | 2/2018 | Hance ................. B65G 1/0492 |
| 2019/0324456 A1* | 10/2019 | Ryan ..................... G06F 9/4806 |
| 2020/0331464 A1* | 10/2020 | Lacaze ...................... G08G 1/22 |
| 2022/0024486 A1* | 1/2022 | Scott ..................... G05D 1/0221 |

FOREIGN PATENT DOCUMENTS

TW    I699636 B    7/2020

OTHER PUBLICATIONS

European Search Report on EP Appl. Ser. No. 21205177.5 dated Mar. 22, 2022 (9 pages).
Nakamura, et al., "Toward solving an obstacle problem by the cooperation of UAVs and UGVs," Applied Computing; Mar. 18, 2013, pp. 77-82.
Foreign Office Action on CA Application 3,138,417 dated Oct. 18, 2023 (4 pages).

\* cited by examiner

*Primary Examiner* — Vivek D Koppikar
*Assistant Examiner* — Jeffrey R Chalhoub
(74) *Attorney, Agent, or Firm* — FOLEY & LARDNER LLP (57) ABSTRACT

Disclosed herein are systems and methods for autonomous vehicle operation. A computing system can include a communication device configured to receive a plurality of event signals from at least a first autonomous vehicle that is traversing a path, and a processor in electrical communication with the communication device and configured to determine whether the event signals are indicative of an obstacle in a portion of the path. The communication device can be configured to receive, from at least a second autonomous vehicle, at least one characteristic of the obstacle captured by at least one sensor of the second autonomous vehicle, and transmit, to at least a third autonomous vehicle, at least one task to clear the obstacle from the portion of the path. The processor can be configured to determine, based on the characteristic of the obstacle, the at least one task to be transmitted by the communication device.

17 Claims, 7 Drawing Sheets

SYSTEMS AND METHODS FOR AUTONOMOUS VEHICLE OPERATION

TECHNICAL FIELD

The following disclosure is directed to systems and methods for operating autonomous vehicles and, more specifically, systems and methods for mitigating obstacles in autonomous vehicle operation.

BACKGROUND

Warehouses or stores for stocking items are typically organized in rows of storage shelves. The rows are separated by aisles to allow people, carts, vehicles, etc. to travel between the rows to access the shelves. In many instances, aisles may be wide enough for one-way or two-way foot and/or vehicle traffic. Due to the relatively fixed nature of the storage shelves and the limited space within an aisle, an obstacle in an aisle can be a significant impediment to the flow of people and/or vehicles.

SUMMARY

Described herein are exemplary systems and methods for mitigating obstacles in autonomous vehicle operation.

In one aspect, the disclosure features a computing system for autonomous vehicle operation. The computing system can include a communication device configured to receive a plurality of event signals from at least a first autonomous vehicle that is traversing a path, and a processor in electrical communication with the communication device and configured to determine whether the event signals are indicative of an obstacle in a portion of the path. The communication device can be further configured to receive, from at least a second autonomous vehicle, at least one characteristic of the obstacle captured by at least one sensor of the second autonomous vehicle, and transmit, to at least a third autonomous vehicle, at least one task to clear the obstacle from the portion of the path. The processor can be further configured to determine, based on the characteristic of the obstacle, the at least one task to be transmitted by the communication device.

Various embodiments of the computing system can include one or more of the following features.

The communication device can be further configured to transmit the task to a controller of the third autonomous vehicle, in which the controller can be configured to navigate, in response to receiving the task, the third autonomous vehicle to the portion of the path to clear the obstacle according to the task. The communication device can be further configured to receive a signal that the obstacle is cleared from the path. The plurality of event signals can indicate at least one of: (i) decreased speed of the first autonomous vehicle while traversing the path; (ii) increased congestion of vehicles or humans in the path; (iii) deviation of the first autonomous vehicle from the path; or (iv) collision with the obstacle. The at least one sensor can include at least one of a camera, a LiDAR sensor, or a depth sensor. The at least one characteristic of the obstacle can include at least one of a size of the obstacle, a shape of the obstacle, a weight of the obstacle, or a type of the obstacle. At least two of the group consisting of the first autonomous vehicle, the second autonomous vehicle, and the third autonomous vehicle are a same autonomous vehicle. The at least one task can be included in a task list for the third autonomous vehicle. The processor, in determining whether the event signals are indicative of an obstacle, can be further configured to determine whether the event signals are indicative of vehicle events not within a set of defined events associated with traversal of the path. The processor, in determining the at least one task to be transmitted by the communication device, can be further configured to compare the characteristic of the obstacle to a characteristic of a known obstacle.

In another aspect, the disclosure features a computer-implemented method for autonomous vehicle operation. The method can include receiving, by a computing system, a plurality of event signals from at least a first autonomous vehicle that is traversing a path and determining, by the computing system, whether the event signals are indicative of an obstacle in a portion of the path. The method can include receiving, by the computing system from at least a second autonomous vehicle, at least one characteristic of the obstacle captured by at least one sensor of the second autonomous vehicle; determining, by the computing system and based on the characteristic of the obstacle, at least one task to clear the obstacle from the portion of the path; and transmitting, by the computing system, the task to at least a third autonomous vehicle.

Various embodiments of the method can include one or more of the following features.

The task can be transmitted to a controller of the third autonomous vehicle, and can further include navigating, by the controller in response to receiving the task, the third autonomous vehicle to the portion of the path to clear the obstacle according to the task. The method can include receiving, by the computing system, a signal that the obstacle is cleared from the path. The plurality of event signals can indicate at least one of: (i) decreased speed of the first autonomous vehicle while traversing the path; (ii) increased congestion of vehicles or humans in the path; (iii) deviation of the first autonomous vehicle from the path; or (iv) collision with the obstacle. The at least one sensor can include at least one of a camera, a LiDAR sensor, or a depth sensor. The at least one characteristic of the obstacle can include at least one of a size of the obstacle, a shape of the obstacle, a weight of the obstacle, or a type of the obstacle. At least two of the group consisting of the first autonomous vehicle, the second autonomous vehicle, and the third autonomous vehicle are a same autonomous vehicle. The at least one task is included in a task list for the third autonomous vehicle. Determining whether the event signals are indicative of an obstacle can include determining whether the event signals are indicative of vehicle events not within a set of defined events associated with traversal of the path.

In another aspect, the disclosure features a non-transitory computer-readable medium having instructions stored thereon that, when executed by one or more computer processors, cause the computer processors to perform operations including receiving a plurality of event signals from at least a first autonomous vehicle that is traversing a path, and determining whether the event signals are indicative of an obstacle in a portion of the path. The operations can further include receiving, from at least a second autonomous vehicle, at least one characteristic of the obstacle captured by at least one sensor of the second autonomous vehicle; determining, based on the characteristic of the obstacle, at least one task to clear the obstacle from the portion of the path; and transmitting the task to at least a third autonomous vehicle.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the systems and methods described herein. In the following description, various embodiments are described with reference to the following drawings.

DETAILED DESCRIPTION

Obstacles present in the paths of autonomous vehicles can be detrimental to the productive and efficient operation of an automated warehouse (or a storage space in which items are organized for picking and/or delivery, e.g., a retail store, a grocery store, a hospital, a school, an office, etc.). Autonomous vehicles and/or computing systems can be configured to infer the existence of obstacles in these paths and take action for mitigating (e.g., moving, removing, etc.) the obstacles.

In various embodiments, one or more autonomous vehicles can be routed from one location in a warehouse to another for picking and/or stocking. To reach a destination location, vehicles may be configured to travel routes through aisles that are prescribed or determined on-the-fly. As described further below, vehicles may have predetermined speeds and/or expected operational efficiency which can be hampered by obstacles in their paths.

The technology described herein may be employed in mobile carts of the type described in, for example, U.S. Pat. No. 9,834,380, issued Dec. 5, 2017 and titled "Warehouse Automation Systems and Methods," the entirety of which is incorporated herein by reference and described in part below.

Exemplary Application to Autonomous Warehouse Carts

Figure 1A:
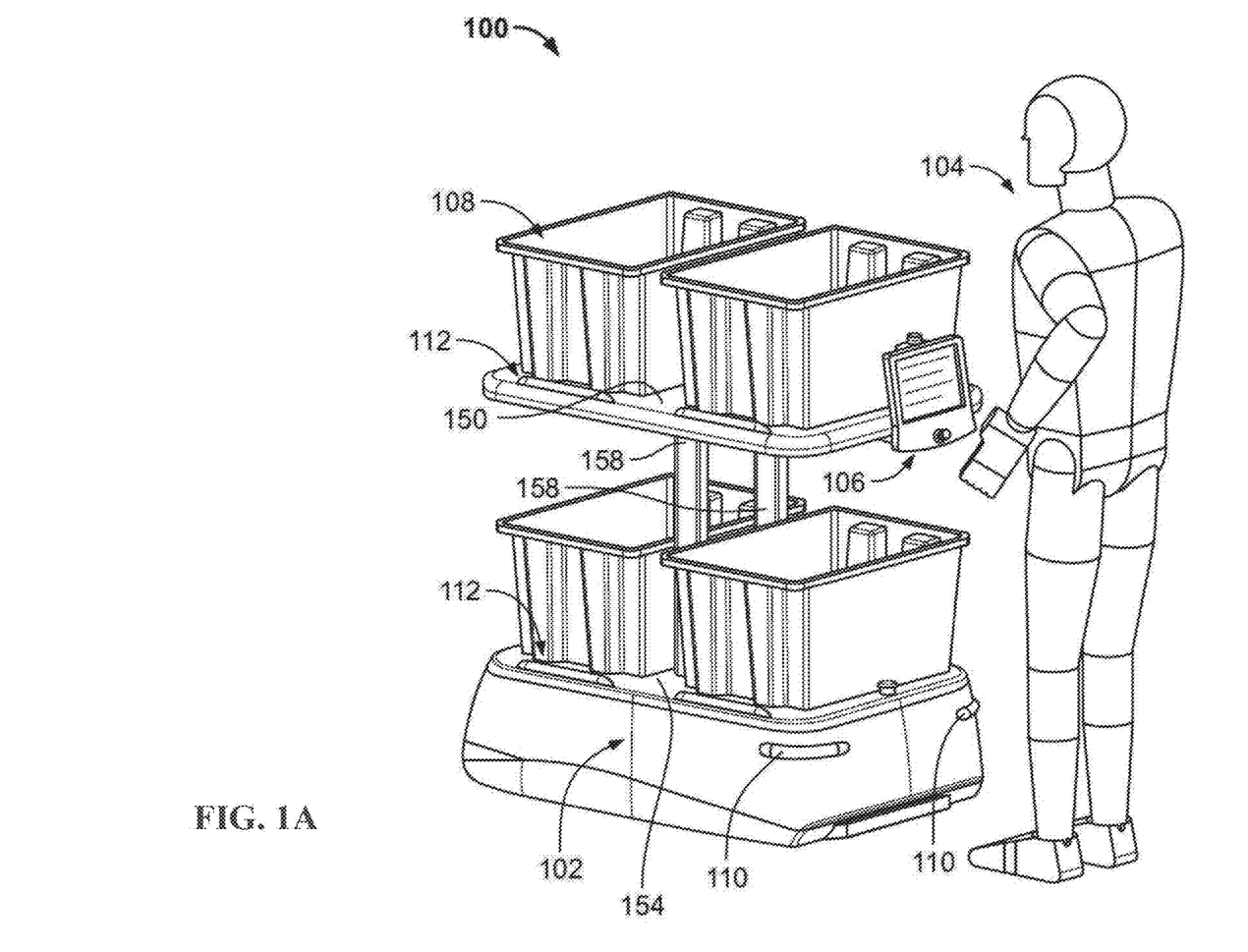
FIG. 1A is a model of an embodiment of an autonomous vehicle configured to collect orders.

FIG. 1A depicts an enhanced cart system 100 including an enhanced cart 102 (e.g., an autonomous vehicle). As illustrated, one or more enhanced carts, often referred to in the industry as picking carts, can work alongside one or more warehouse workers 104 (also referred to as associates) to move inventory items around a warehouse. The enhanced carts 102 are intended to assist in most warehouse tasks, such as picking, re-stocking, moving, sorting, counting, or verifying items (e.g., products). These carts 102 can display information to the associate 104 through the use of a user interface (e.g., screen) 106 and/or onboard visual and/or audible indicators that improve the performance of the associates 104. The cart 102 can be propelled by a motor (e.g., an electric motor) that is coupled to a power source (e.g., a battery, a supercapacitor, etc.), such that the cart 102 moves autonomously and does not require being pushed or pulled by a human or other force. The cart 102 may travel to a charging area to charge its battery or batteries.

Referring still to FIG. 1A, the enhanced carts 102 may be configured to carry one or many similar or distinct storage containers 108, often in the form of totes or boxes, that can be used to hold one or more different products. These storage containers 108 may be removable from the enhanced cart 102. In some cases, each container 108 can be used as a separate picking location (i.e., one container 108 is a single order). In other cases, the containers 108 can be used for batch picking (i.e., each container 108 can contain multiple complete or partial orders). Each container 108 may be assigned to one or many different stations for post-pick sortation and processing. In one embodiment, one or more of the containers 108 are dedicated to batch picking of multiple types of products and another one or more containers 108 are dedicated to picking multiple quantities of a single product (e.g., for orders that only have one item). This singleton picking allows the warehouse to skip secondary sortation and deliver products directly to a packaging station. In another embodiment, one or more of the containers 108 are assigned to order picking (e.g., for potentially time sensitive orders) and one or more of the containers 108 are assigned to batch picking (e.g., for lower cost or less time sensitive orders). In yet another embodiment, one or more of the containers 108 carry product that will be used to re-stock product into storage locations. Another option is for the enhanced cart 102 to move product and/or shipments throughout the warehouse as needed between different stations, such as packing and shipping stations. In yet another implementation, one or more of the containers 108 is left empty to assist in counting product into and then back out of the container 108 as part of a cycle count task regularly carried out in warehouses for inventory management. The tasks may be completed in a mode dedicated to one task type or interleaved across different task types. For example, an associate 104 may be picking products into container "one" on the enhanced cart 102 and then be told to grab products from container "two" on the enhanced cart 102 and put them away in the same aisle.

Figure 1B:
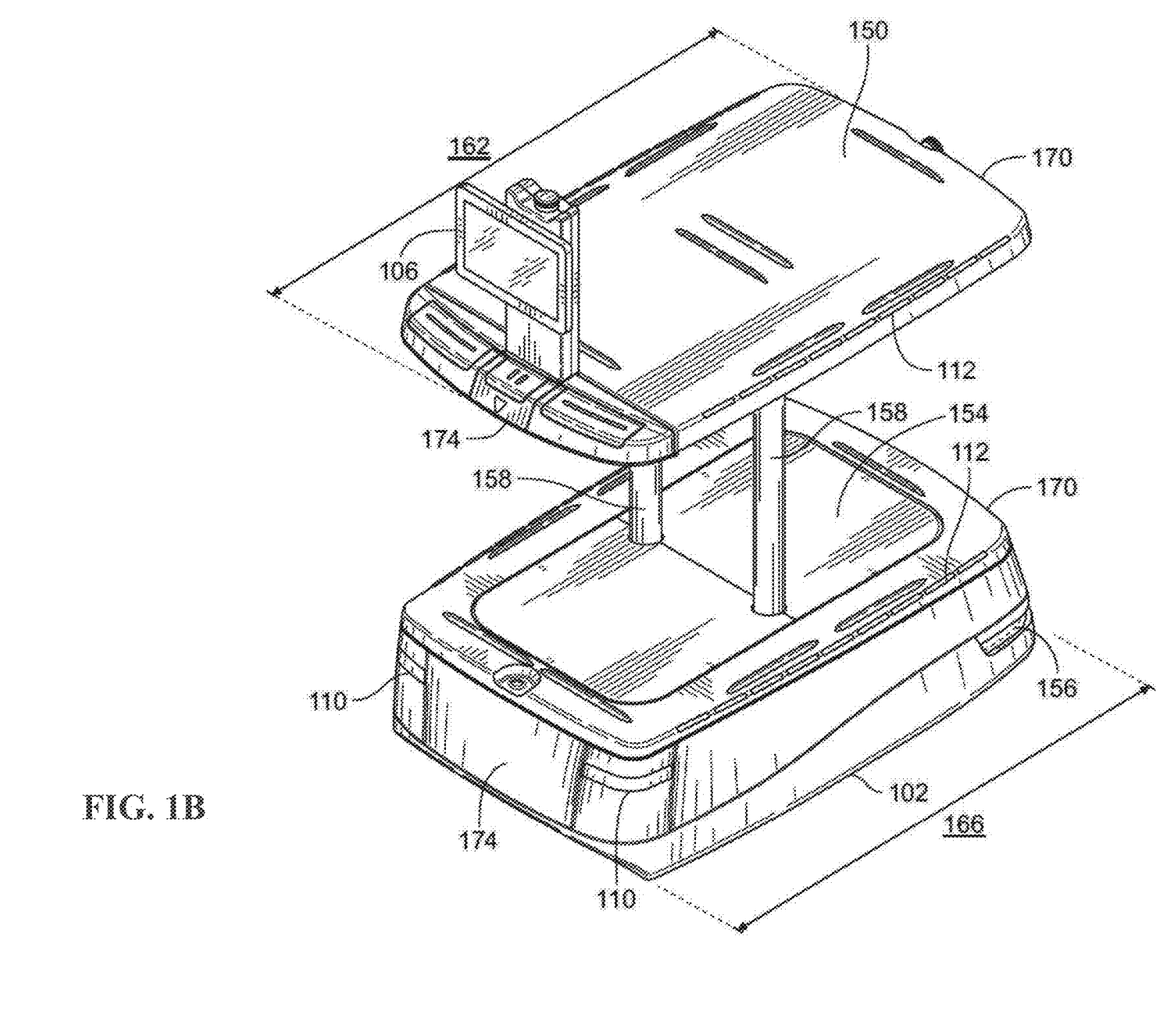
FIG. 1B is a model of another embodiment of an autonomous vehicle configured to collect orders.

FIG. 1B is an alternative embodiment of the enhanced cart 102, and is shown (for ease of understanding) without the storage containers 108 being present. As before, the enhanced cart 102 includes the screen 106 and lighting indicators 110, 112. In operation, the storage containers 108 may be present on the enhanced cart 102 depicted in FIG. 1B. With reference to both FIGS. 1A and 1B, the enhanced cart 102 may include first and second platforms 150, 154 for supporting a plurality of containers 108 capable of receiving products. At least one support 158 may support the first platform 150 above the second platform 154. The at least one support 158 may be substantially centrally-located along respective lengths 162, 166 of the first and second platforms 150, 154 between front and back ends 170, 174 thereof and may support the first and second platforms 150, 154 at locations disposed within interior portions of the first and second platforms 150, 154. As illustrated in FIG. 1B, the front end 170 of the cart 102 may define a cutout 156. There may be one or more sensors (e.g., light detecting and ranging (LiDAR) sensors) housed within the cutout 156. The cutout 156 permits the sensor(s) to view and detect objects in front of and to the side of (e.g., more than 180° around) the cart 102.

The following discussion focuses on the use of autonomous vehicles, such as the enhanced cart 102, in a warehouse environment, for example, in guiding workers around the floor of a warehouse and carrying inventory or customer orders for shipping. However, autonomous vehicles of any type can be used in many different settings and for various purposes, including but not limited to: guiding shoppers or stocking inventory in a retail store, driving passengers on roadways, delivering food and medicine in hospitals, carrying cargo in shipping ports, cleaning up waste, etc. The autonomous vehicles can be employed in a warehouse-like environment open to the public (e.g., big box stores or wholesalers). This disclosure, including but not limited to the technology, systems, and methods described herein, is equally applicable to any such type of autonomous vehicle.

Obstacles in Vehicle Paths

In a warehouse setting (or in a retail store, a grocery store, a hospital ward, etc.), a computing system (e.g., a computing system internal or external to an autonomous vehicle 102) can determine a path for the autonomous vehicle, thereby enabling the vehicle to collect items located throughout the warehouse according to a picklist (for a customer order) or a task list (e.g., for re-stocking items, moving items, clearing obstacles, etc.). A controller can navigate the vehicle through an optimized sequence of locations within the warehouse such that a worker (also referred to as an associate or picker) or a mechanical device (e.g., a robotic arm coupled to the autonomous vehicle) can physically place an item into a container (also referred to as a tote) for the vehicle to carry. The controller may be a central controller (e.g., part of a remote computing system), a vehicle controller on the autonomous vehicle, or may include two or more controllers (e.g., part of a remote computing system and/or autonomous vehicle) configured to operate together (e.g., via a communication link). For example, a central controller may send instructions to a vehicle controller to navigate the autonomous vehicle about a warehouse to restock items on shelves or collect items for a customer order. In another example, the vehicle controller can be configured to navigate the autonomous vehicle to move items around a warehouse. As discussed above, the warehouse can be organized into a series of aisles, in which each aisle has enough space for one or more vehicles to traverse while collecting items on shelves or racks on one or more sides of the aisle. Accordingly, aisles are typically kept clear of significant obstacles to allow for quick and easy movement of people and/or vehicles.

In some instances, a particular location in the path of the autonomous vehicle (e.g., within an aisle) can be blocked by an obstacle. Obstacles can be of varying size, weight, shape, or material. For example, obstacles in a warehouse environment may include debris, packing material (e.g., cardboard, tape, packing foam, etc.), liquid spills (e.g., from cleaning supplies, shelved products, a roof leak, etc.), containers 108, autonomous vehicle parts, etc. In another example, obstacles in a retail environment may include paper signage, receipts, shopping carts, shopping baskets, dropped items, etc.

Some obstacles, e.g., a wooden pallet or a liquid spill, may be large enough or simply impassible so as to block the path of autonomous vehicles 102 in a given aisle. In such cases, one or more sensors of the vehicle 102 may detect the obstacle and stop some distance away. Some obstacles, e.g., wire or tape, may be small such that they can be driven over or picked up by a worker accompanying the vehicle. However, even small obstacles can impair the efficient operation of the warehouse by preventing or slowing autonomous vehicles from collecting items and/or restocking inventory along their paths. For example, some small objects may even become stuck to the underside of the vehicle 102, requiring intervention by a human to remove.

Computing Systems for Autonomous Vehicle Operation

Figure 2:
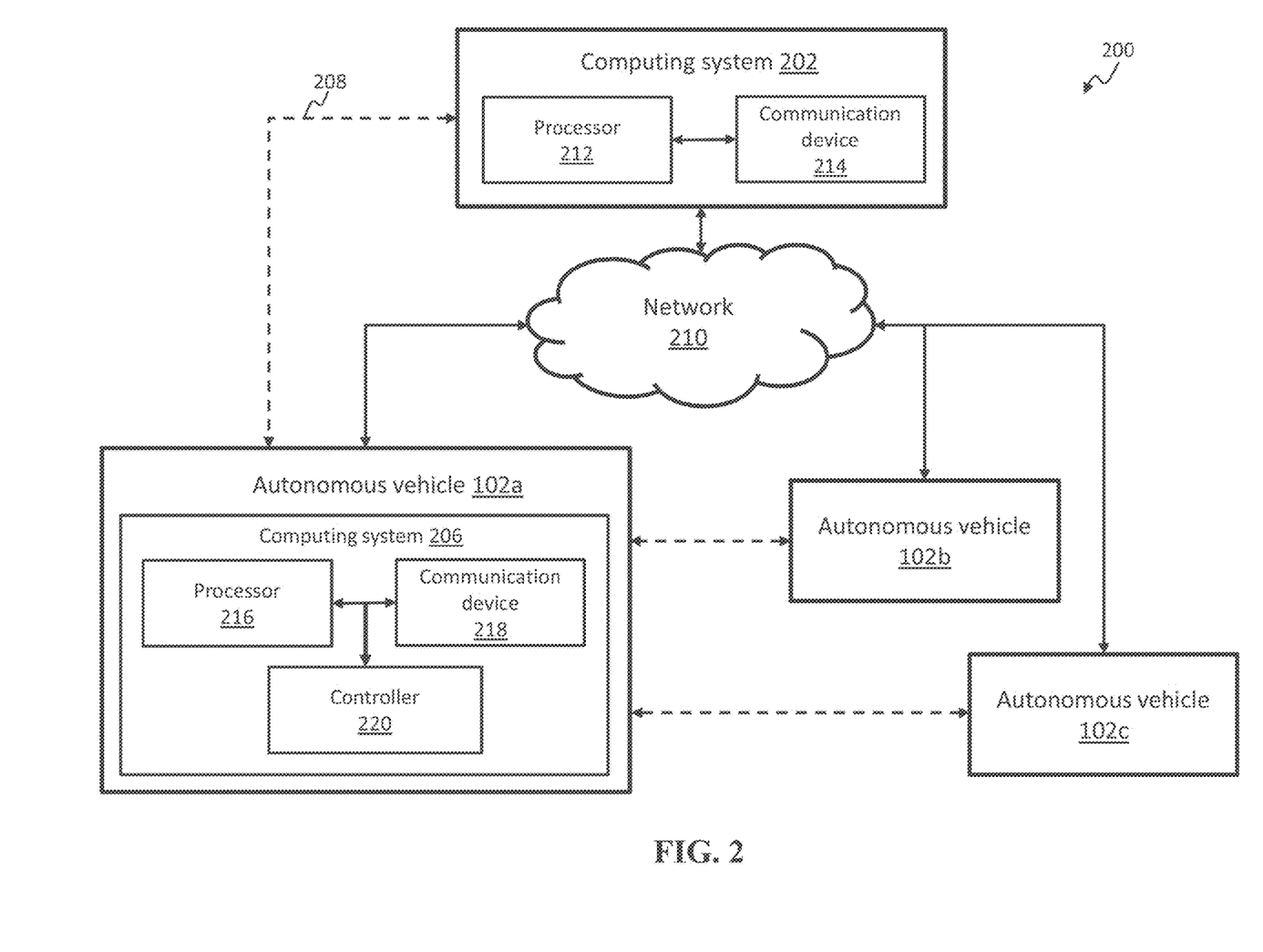
FIG. 2 is a diagram of an embodiment of a system for mitigating obstacles by autonomous vehicles.

FIG. 2 illustrates a system 200 configured to mitigate obstacles in autonomous vehicle operation. The system 200 may include a remote computing system 202 configured to be coupled directly or indirectly to one or more autonomous vehicles 102a, 102b, 102c (collectively referred to as 102). For instance, the remote computing system 202 may communicate directly with the computing system 206 of an autonomous vehicle 102 (e.g., via communication channel 208). Additionally or alternatively, the remote computing system 202 can communicate with one or more autonomous vehicles 102 via a network device of network 210. In some embodiments, the remote computing system 202 may communicate with a first autonomous vehicle (e.g., vehicle 102a) via a second autonomous vehicle (e.g., vehicle 102b).

The exemplary remote computing system 202 may include a processor 212 coupled to a communication device 214 configured to receive and transmit messages and/or instructions. The exemplary vehicle computing system 206 may include a processor 216 coupled to a communication device 218 and a controller 220. The vehicle communication device 218 may be coupled to the remote communication device 214. The vehicle processor 216 may be configured to process signals from the remote communication device 214 and/or vehicle communication device 218. The controller 220 may be configured to send control signals to a navigation system and/or other components of the vehicle 102, as described further herein.

As discussed herein and unless otherwise specified, the term "computing system" may refer to the remote computing system 202 and/or the vehicle computing system 206. The computing system(s) may receive and/or obtain information about a customer order (e.g., from another computing system or via a network), including the list of items, the priority of the order relative to other orders, the target shipping date, whether the order can be shipped incomplete (without all of the ordered items) and/or in multiple shipments, etc. A processor (e.g., of system 202 and/or of system 206) may process the customer order to determine an optimal path for one or more autonomous vehicles 102 to collect items in a "picklist" for the order. For example, a picklist of items may be assigned to a single vehicle or to two or more vehicles 102.

The determined path may be transmitted to the controller 220 of the vehicle 102. The controller 220 may navigate the vehicle 102 in an optimized sequence of stops (also referred to as a trip) within the warehouse to collect the items. At a given stop, a worker near the vehicle 102 may physically place the item into a container 108 for the vehicle 102 to carry. Alternatively or additionally, the autonomous vehicle 102 may include an apparatus (e.g., a robotic arm) configured to collect items into a container 108.

Systems and Methods for Mitigating Obstacles

Figure 3:
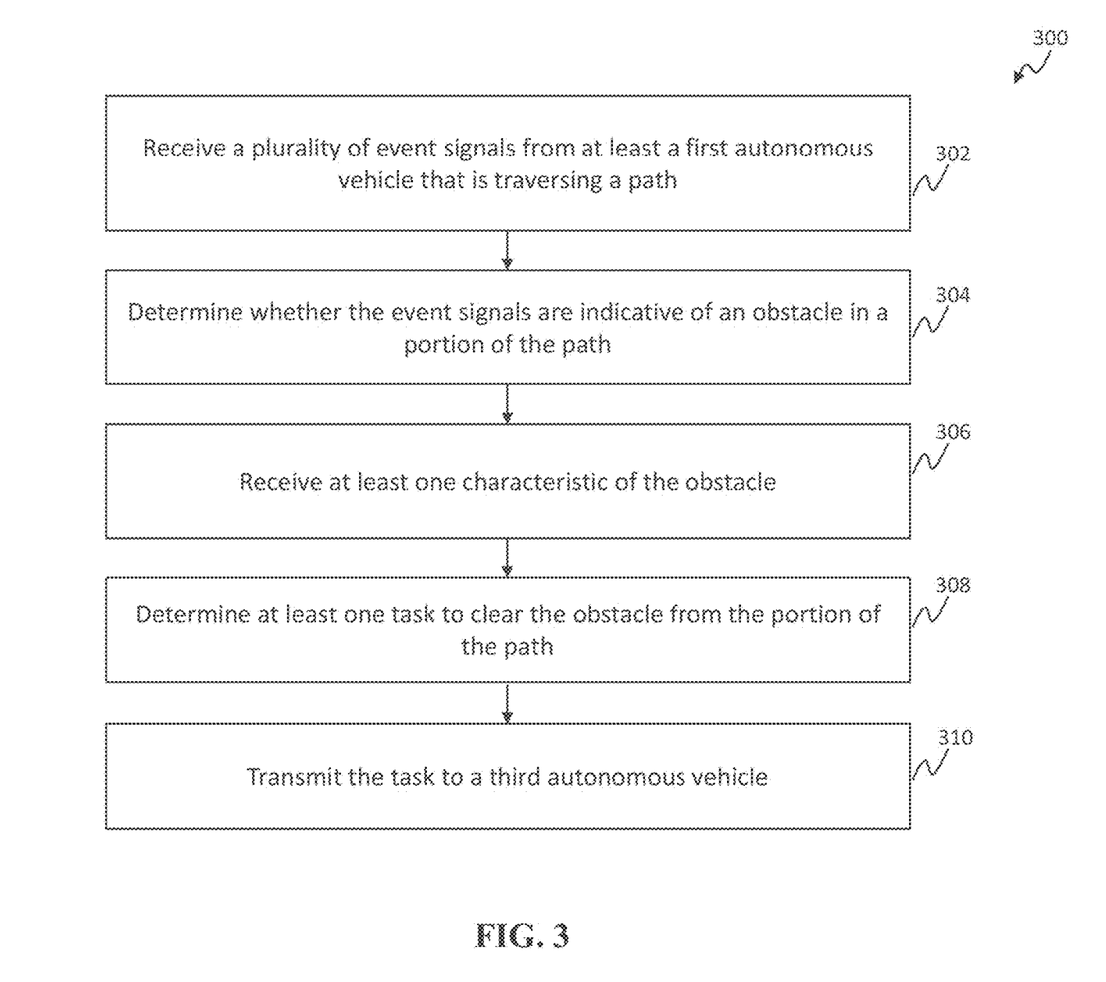
FIG. 3 is a flowchart of an embodiment of a method for mitigating obstacles by autonomous vehicles.
Figure 4:
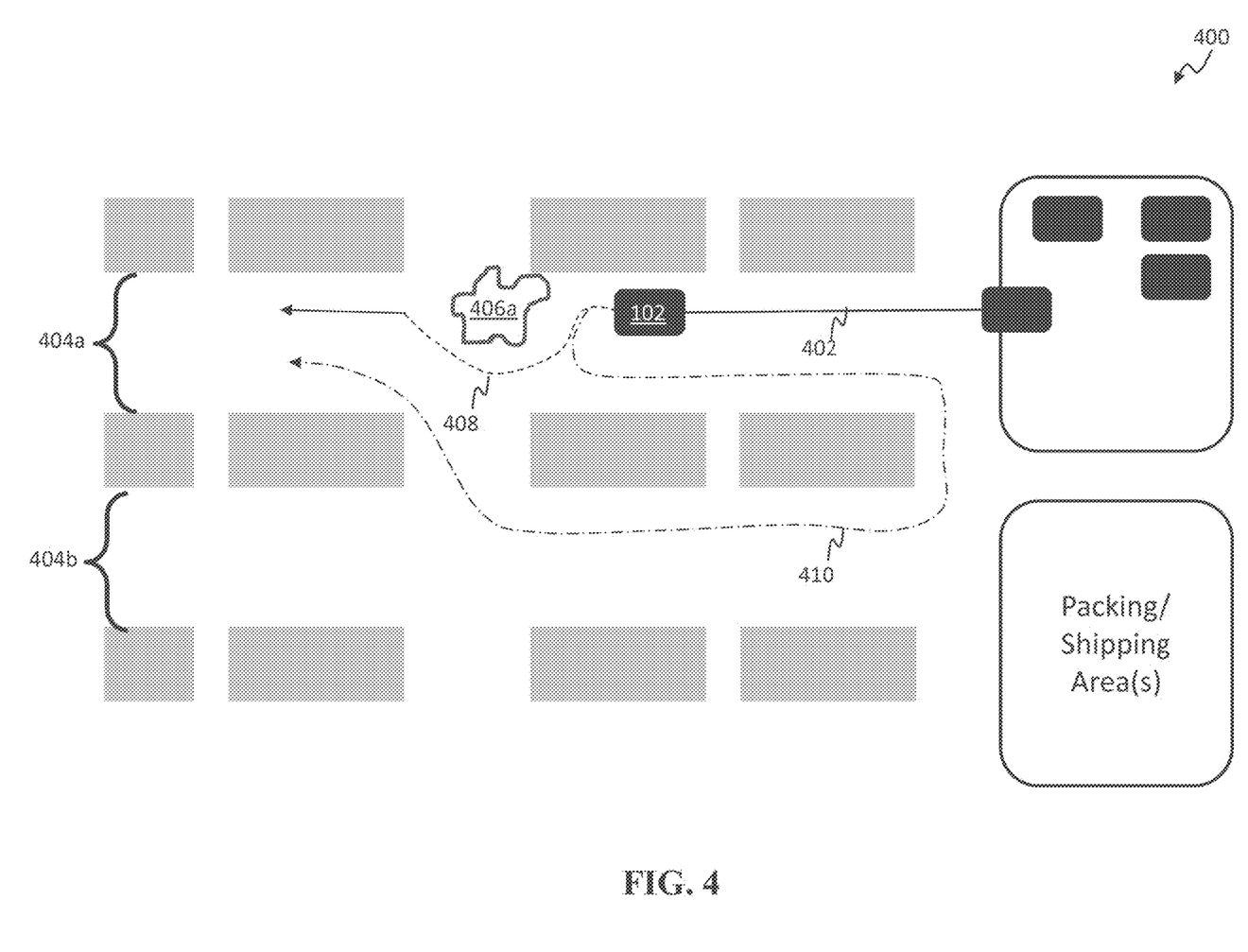
FIG. 4 is a diagram of an embodiment of a warehouse configuration in which one or more autonomous vehicles are operated to mitigate obstacles in the warehouse.
Figure 5:
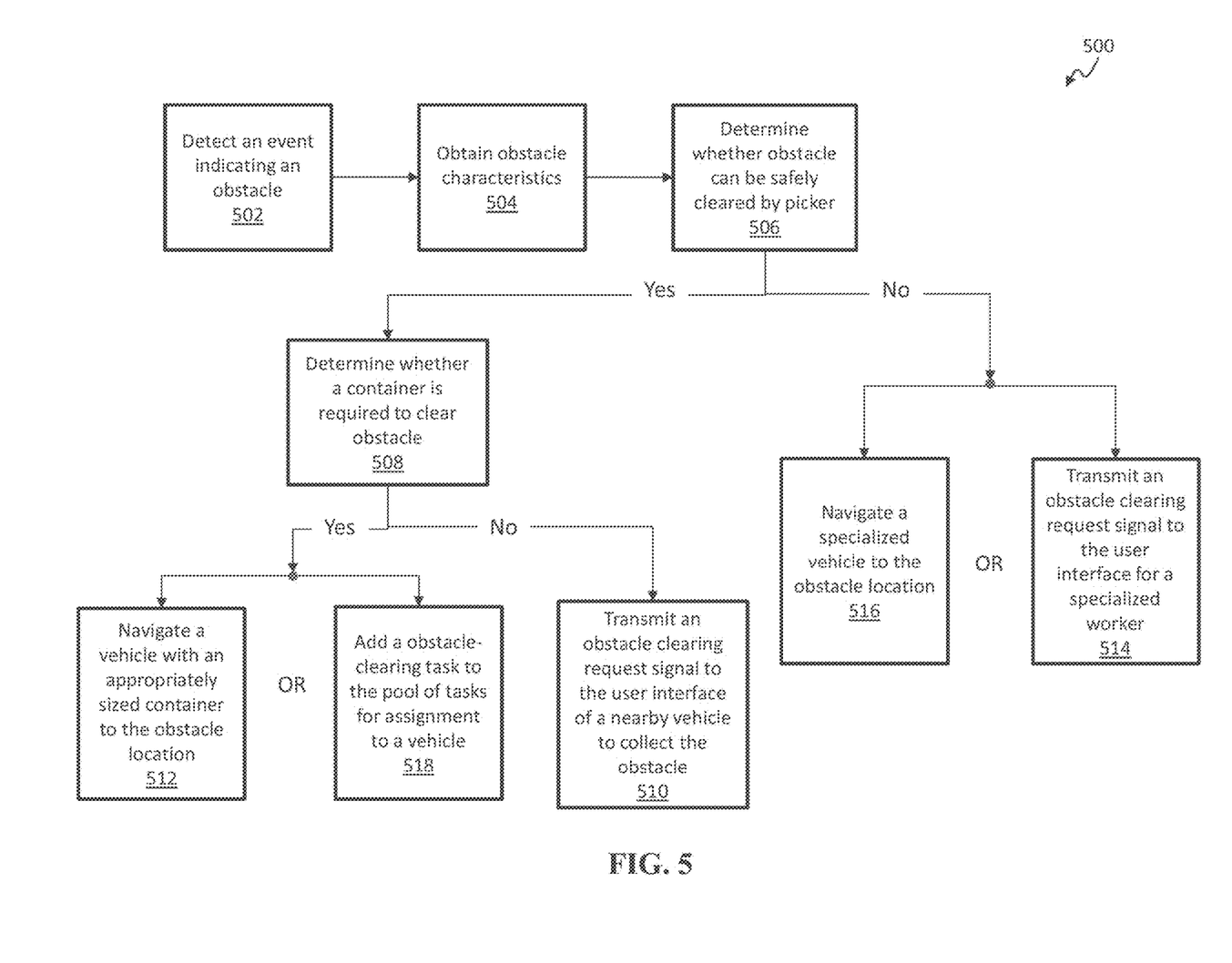
FIG. 5 is a diagram of an embodiment of a workflow for mitigating obstacles in autonomous vehicle operation.

FIG. 3 is a flowchart of an exemplary method 300 for mitigating obstacles in autonomous vehicle operation. FIG. 4 illustrates an exemplary warehouse configuration 400 in which one or more autonomous vehicles 102 are employed to mitigate obstacles. FIG. 5 illustrates a workflow for mitigating obstacles in autonomous vehicle operation. For the sake of clarity and conciseness, FIGS. 3-5 are discussed together herein.

One or more systems enabling the automated warehouse can be configured to detect and/or mitigate obstacles. These systems can include (i) a remote computing system configured to manage one or more components of the warehouse, (ii) autonomous vehicles configured to collect items for customer orders or restock inventory, and/or (iii) specialized autonomous vehicles, as described further below. The remote computing system can be configured to communicate with the respective computing systems of the autonomous vehicles, e.g., for transmitting paths for the vehicles to navigate, tasks for completion, etc.

In step 302 of method, a computing system (e.g., the remote computing system 202 and/or the vehicle computing system 206) can receive signals from one or more vehicles 102 in a particular path 402 in an aisle 404a or 404b of the warehouse 400. These signals can be associated with events occurring in the particular path 402 or aisle 404a that may indicate the presence of an obstacle 406a (workflow process 502). One or more of the following types of event signals may be generated by a vehicle 102 and/or received by the computing system.

In some embodiments, the event signals can include data from one or more sensors of the vehicle. For example, a vehicle sensor may be a camera, a LiDAR sensor, a depth sensor, etc. In some embodiments, the event signals can include one or more images, video, audio, depth information, etc. In some embodiments, the vehicle 102 may be equipped with a stereo camera configured to capture visual and depth information for the vehicle's field of view (e.g., via the cutouts 156).

The event signals may indicate a vehicle speed slower than expected or prescribed in the path 402. For example, the computing system may assign speed limits to one or more paths and/or aisles. A vehicle 102 may be configured to operate at or below the speed limits according to the path 402 or aisle 404a the vehicle is traveling. In some embodiments, the computing system (e.g., 202 or 206) may compare the actual speed to assigned speed limits of the path or aisle (or a portion thereof. For example, assigned speed limits may vary according to different portions of the same path or aisle, may depend on a turn radius required for the vehicle to move between paths or aisles, etc. If the actual speed is below an acceptable threshold below the assigned speed (e.g., 5% below, 10% below, etc. of the assigned speed), then an event signal may be generated accordingly.

In another example, the vehicle 102 may have an internal speed limit that may be the same or different from the path or aisle speed limits. This internal speed limit may be determined based on the particular operating condition (e.g., age, mechanical condition, charge level, weight of the load carried by the vehicle, etc.) of the vehicle 102. In some embodiment, the maximum internal speed limit can be based on a distance between the vehicle and the nearest unexpected object detected by the sensor(s). The computing system 206 of vehicle 102 may be configured to compare the internal speed limit to the actual speed of the vehicle 102 to determine whether an event signal should be generated. In some embodiments, a communication device 218 of the vehicle 102 may be configured to report its internal speed limit to the remote computing system 202 periodically, intermittently, upon request, etc. Additionally, the vehicle 102 may report its actual speed to the remote computing system 202 continuously, intermittently, upon request, etc. For example, the device 218 may report the actual speed once per second, per minute, every 3 minutes, every 5 minutes, every 10 minutes, etc. The remote computing system 202 may compare an actual speed of the vehicle 102 to a report of the internal speed limit to determine whether an event signal should be generated. If the actual speed is below an acceptable threshold below the internal speed limit (e.g., 5% below, 10% below, etc. of the internal speed limit), then an event signal may be generated accordingly.

In some instances, the event signals may indicate inefficient collecting or restocking of items by vehicles 102. This may occur if vehicles 102 are slowing down to go around or travel alternative routes due to the presence of an obstacle 406a. For example, an average level of efficiency for picking or restocking items in a warehouse 400 by a particular vehicle 102 may be determined and stored by a computing system. Alternatively or additionally, a predetermined threshold of efficiency may be determined for vehicles 102 (e.g., of a vehicle type, for designated paths 402, in a particular warehouse configuration 400, etc.). A vehicle's level of efficiency on a particular day may be compared to the average level or the predetermined threshold to determine whether the particular level is less efficient. Accordingly, the event signal may include the efficiency comparison and/or the particular level of efficiency.

In some instances, the event signals may indicate increased congestion in vehicles and/or human workers. Increased congestion may indicate that vehicles are backed up due to the presence of an obstacle 406a. For example, an average congestion level for a particular path 402 or aisle 404a may be determined and stored by a computing system. Alternatively or additionally, a predetermined threshold of congestion level may be determined for the particular path 402 or aisle 404a. The congestion level of a particular time or day may be compared to the average congestion level or the predetermined threshold. In some embodiments, congestion level may be determined by a comparison of the positions of two or more vehicles 102 in the path 402 or aisle 404a. In some embodiments, congestion level may be determined based on visual information from images or video captured by one or more cameras and/or depth information from one or more depth sensors of vehicles 102. For example, a first vehicle may capture visual or depth information to a second vehicle (or human) in the same path 402 or aisle 404a. The visual or depth information may be processed to determine a distance between the first and second vehicles.

In some instances, the event signals may indicate a deviation of a vehicle 102 from the path 402. The deviation may indicate that the presence of an obstacle in the path of the vehicle. For example, the vehicle 102 may be on a prescribed path 402 and may deviate from the path 402 to go around an obstacle 406a via deviated path 408. Alternatively, a deviation may include the vehicle 102 turning around to take a different path 410.

In some embodiments, the event signals may indicate human intervention in the vehicle operation. For example, a human may stop, decrease the speed, or change the route of the vehicle 102 upon seeing an obstacle by interacting with the user interface 106.

In some embodiments, one event signal type may be a trigger for at least one other event signal. For example, a first event signal may indicate that the vehicle 102 is slowing down in a particular path 402. The transmission of the first event signal may trigger a process in the computing system 206 of the vehicle 102 to capture sensor data (e.g., by a camera sensor, by a LiDAR sensor, by a depth sensor, etc.) of the vehicle's surroundings. For example, a first event signal may indicate increased congestion, which can trigger the recording of sensor data for a certain duration (e.g., 0.5, 1, 3, 5, 10 minutes, or more) or distance travelled (e.g., 20 feet, 50 feet, 100 feet, or more) by the vehicle 102. This sensor data may be transmitted (e.g., by communication device 218) as a second event signal to the computing system (e.g., computing system 202).

In step 304, the computing system can process one or more received event signals to determine whether there is an obstacle in the path (e.g., at or near a particular location in the path). For example, the processor (e.g., processor 212 and/or 216) may process an event signal including visual information using image processing techniques to determine the presence of an obstacle. In another example, the processor may process an event signal indicating the decreased speed of a vehicle 102 to determine whether the vehicle 102 is slowing or stopping for an obstacle.

In some cases, two or more instances of the same event signal type can be indicative of an obstacle. For example, an obstacle may be determined if an autonomous vehicle slows down each time along the same portion of the path. Each time, the vehicle 102 may transmit an event signal indicating the slower speed. In some embodiments, the processor may compare the event signals to at least one other event signal to categorize or group the event signal type for a particular path 402 and/or aisle 404a. If there are a number of the same or similar event signals above a threshold, then the processor may determine the presence of an obstacle. For example, referring to FIG. 5, if vehicle 102 travels path 402 four times in a given duration and, each time, deviates from the path 402 (e.g., via path 408 or path 410) upon approaching obstacle 406a, then four event signals indicating the deviated path are transmitted to the computing system. A processor of the computing system may compare the received four event signals to a threshold (e.g., three, four, five event signals, etc.) to determine whether an obstacle is present.

In other cases, two or more autonomous vehicles 102 reporting the same or similar event can indicate an obstacle. For example, an obstacle may be determined if multiple autonomous vehicles slow down at the same portion of the path 402. In each scenario, the speed of the autonomous vehicles can be received and/or monitored by the computing system and compared to historical speeds for the particular vehicles and/or for the particular location on the path. For example, paths within the warehouse may be assigned "speed limits" or ranges of speed to which vehicles are configured to adhere. If the vehicle is determined to be traveling below the limit or range, the computing system may infer that an obstacle exists in the path.

In some embodiments, the receiving of the event signals can trigger the collecting and/or recording of data by one or more vehicles on the particular path. In step 306, an autonomous vehicle can employ one or more on-board sensors (e.g., camera(s), LiDAR, etc.) to capture data of an obstacle. For example, the vehicle camera(s) can collect one or more images along the particular portion of the path. In another example, a depth sensor of the vehicle can collect data along the particular portion of the path. The sensor data can be processed to determine characteristics of the obstacle (e.g., its size, shape, weight, type, material, etc.) (workflow process 504). For example, a processor may employ various techniques (e.g., machine learning techniques, subtractive geometry techniques, etc.) to determine characteristics of the obstacle.

In step 308, based on the captured characteristics of the obstacle, the computing system can determine one or more tasks to mitigate or clear the obstacle from the path. For example, the system may determine whether the obstacle can be safely cleared by a human worker (workflow process 506). In some embodiments, to determine whether the obstacle can be safely handled by a worker 104, the computing system can compare an image of the obstacle to images of known obstacles (e.g., cart, basket, product, etc.). Each of these known obstacles can be labelled as safe or unsafe for normal handling. In some embodiments, the system can determine whether the obstacle is safe for handling based on the obstacle size determined from the image or video.

If the obstacle can be cleared (e.g., the obstacle is small enough, light enough, non-toxic, etc.) by a human worker in the vicinity of the obstacle (e.g., a picker, a stocker, etc.), the system may determine whether a container is required for transporting and/or clearing the obstacle (workflow process 508). In step 310, the computing system may send a signal with instructions to a user interface 106 (e.g., of an autonomous vehicle or other networked system) (workflow process 510). If a container 108 is needed for clearing the obstacle, the computing system may transmit a signal to a controller of an autonomous vehicle in the vicinity of the obstacle to navigate to the obstacle location (workflow process 512). In some cases, the user interface 106 may be of the same autonomous vehicle that transmitted event signals on the path and/or collected data of the obstacle characteristics. In some instances, the task may also be sent to one or more additional user interfaces to involve at least one additional human worker in clearing the obstacle. The user interface 106 may be configured to receive one or more of an input from the worker indicating that the obstacle was successfully cleared, an input indicating that the obstacle was not cleared, an input requesting special assistance with the obstacle, etc.

In some cases, the obstacle may not be able to be easily cleared due to its size, shape, weight, type, toxicity, etc. If, for example, the obstacle cannot be cleared by a nearby human worker, the task(s) may be transmitted to a user interface of another autonomous vehicle and/or the user interface of a remote computing system (e.g., system 202) (workflow process 514). In some cases, the task may be transmitted to a controller of another autonomous vehicle for navigating to the obstacle location (workflow process 516). In some embodiments, the task may be transmitted to an autonomous vehicle that is within a certain travel distance from the obstacle, a vehicle that is navigating in a direction toward the obstacle, a vehicle with sufficient space aboard for the obstacle (e.g., based on the obstacle characteristics) and/or a vehicle with lower priority tasks. In some embodiments, if a vehicle 102 meeting the criteria is identified and the vehicle is in the process of picking items for a customer order, the computing system can send the vehicle the cleanup task, remove the order corresponding to the empty container on the vehicle, and integrate that order back into the main pool of orders for inducting onto future available vehicles for customer picking. In some embodiments, the processor can conduct a cost analysis to determine whether a vehicle 102 should prioritize an obstacle-clearing task over a customer order. For instance, because some obstacles can inefficiency for or completely block multiple vehicles (and therefore each of their customer orders), such obstacles can be prioritized over customer orders. Other obstacle types may be lower priority depending on the cost analysis.

For example, the other autonomous vehicle may be a specialized or designated vehicle for clearing obstacles, a larger vehicle, a vehicle with a larger container, a vehicle with a particular container (e.g., for liquids, etc.). In some embodiments, the obstacle may be too large or shaped such that a full shelf or level (e.g., platform 150 or 154) of a vehicle 102 can be used to transport the obstacle. In another example, the task may be transmitted to a user interface that is accessed by workers other than pickers or stockers, e.g., workers that are assigned clean-up or maintenance activities. For example, these workers may specialize in clearing obstacles and/or handling other maintenance activities. These workers may accompany other types of autonomous vehicles or robots configured to clear obstacles.

In some embodiments, the obstacle-clearing task can be integrated into a regular work task list for an autonomous vehicle (workflow process 518). For example, the location of the obstacle can be included as a stop for the vehicle among its several stops to pick items for a customer order and/or restock items within the warehouse. The obstacle's location can be used to determine an optimal path for the vehicle 102, similar to determining an optimal path in collecting items for a customer order. The relative priority of the obstacle clean-up task as compared with customer orders or other work tasks in the system can be configured based on the size of the obstacle and/or the level of poor performance of the vehicles near the obstacle as initially measured. In some embodiments, the computing system can generate a specific task for clearing the obstacle. Such an obstacle-clearing task may include information including at least of the type of worker required, the type of vehicle required, the size or shape of container required, the type of the obstacle, one or more characteristics of the obstacles, images of the obstacle, etc.

Note that, in some instances, the vehicles 102 may be navigated away from a specified area around the obstacle for a particular time window to enable safe removal and/or to increase efficiency in other tasks. In some embodiments, the vehicle 102 itself can be configured to clear the obstacle, e.g., by a robotic arm or by pushing the obstacle with the front portion 170 or back portion 174 of the vehicle 102.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 6:
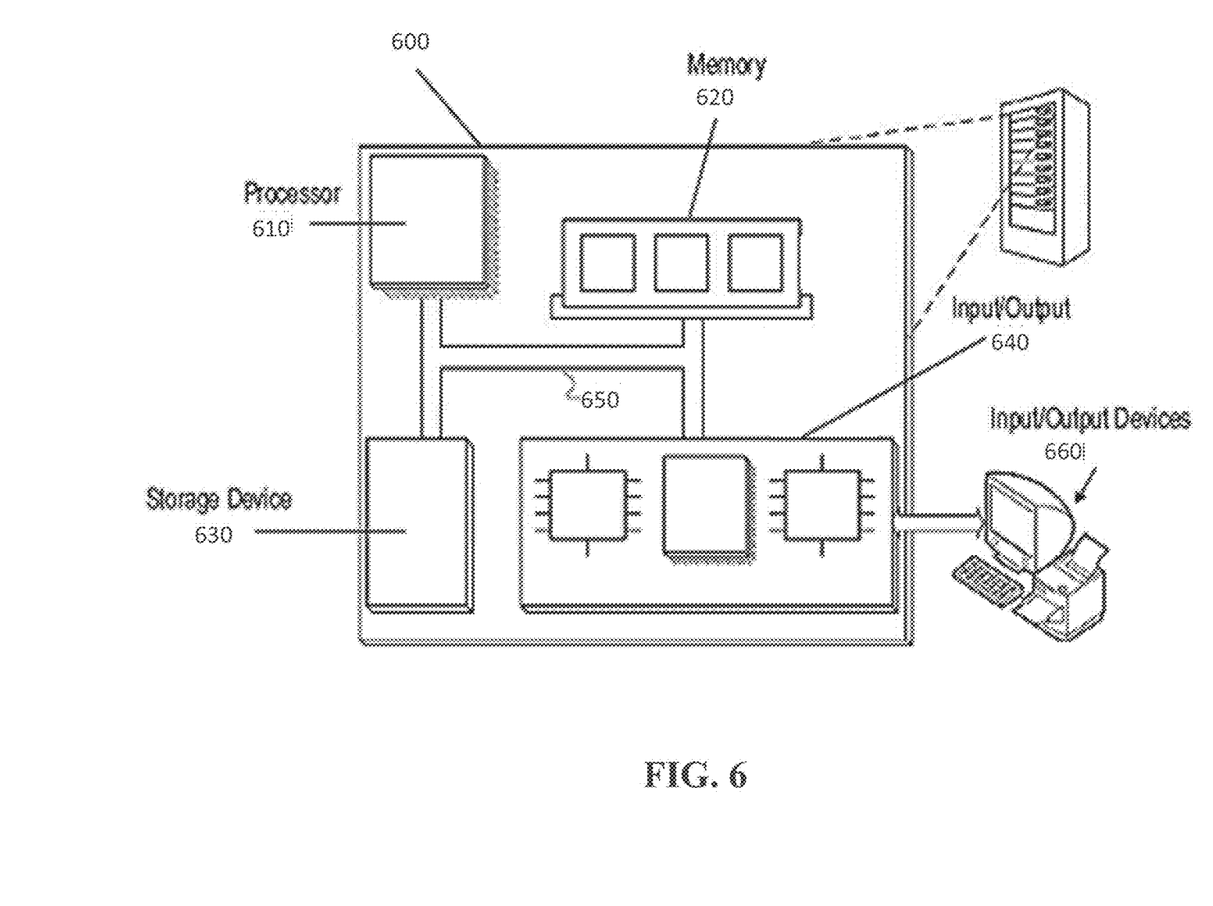
FIG. 6 is a block diagram of an embodiment of a computer system as may be used in implementing the systems and methods described herein.

FIG. 6 is a block diagram of an example computer system 600 that may be used in implementing the systems and methods described herein. General-purpose computers, network appliances, mobile devices, or other electronic systems may also include at least portions of the system 600. The system 600 includes a processor 610, a memory 620, a storage device 630, and an input/output device 640. Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a nonvolatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-date drive, a flash drive, or some other large capacity storage device. For example, the storage device may store long-term data (e.g., database data, file system data, etc.). The input/output device 640 provides input/output operations for the system 600. In some implementations, the input/output device 640 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, such as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computing system for autonomous vehicle operation, the computing system comprising:
   a computing device configured to receive a plurality of event signals from at least a first autonomous vehicle that is traversing a path; and
   a processor in electrical communication with the computing device and configured to determine whether the event signals are indicative of an obstacle at least partially blocking the path of the first autonomous vehicle,
   wherein the computing device is further configured to:
      receive, from at least a second autonomous vehicle, at least one characteristic of the obstacle captured by at least one sensor of the second autonomous vehicle; and
   wherein the processor is further configured to:
      determine, based on the characteristic of the obstacle, at least one task to clear the obstacle from the portion of the path, wherein the processor is further configured to compare the characteristic of the obstacle to a characteristic of a known obstacle;
      identify, based on the characteristic of the obstacle, a third autonomous vehicle having a container that is capable of clearing the obstacle; and
      deploy the third autonomous vehicle to complete the at least one task, wherein the at least one task is included in a task list for the third autonomous vehicle.

2. The computing system of claim 1, wherein the computing device is further configured to transmit the at least one task to a controller of the third autonomous vehicle, the controller being configured to navigate, in response to receiving the at least one task, the third autonomous vehicle to the portion of the path to clear the obstacle according to the at least one task.

3. The computing system of claim 1, wherein the computing device is further configured to receive a signal that the obstacle is cleared from the path.

4. The computing system of claim 1, wherein the plurality of event signals indicate at least one of:
  (i) decreased speed of the first autonomous vehicle while traversing the path;
  (ii) increased congestion of vehicles or humans in the path;
  (iii) deviation of the first autonomous vehicle from the path; or
  (iv) collision with the obstacle.

5. The computing system of claim 1, wherein the at least one sensor comprises at least one of a camera, a LiDAR sensor, or a depth sensor.

6. The computing system of claim 1, wherein the at least one characteristic of the obstacle comprises at least one of a size of the obstacle, a shape of the obstacle, a weight of the obstacle, or a type of the obstacle.

7. The computing system of claim 1, wherein at least two of the group consisting of the first autonomous vehicle, the second autonomous vehicle, and the third autonomous vehicle are a same autonomous vehicle.

8. The computing system of claim 1, wherein the processor, in determining whether the event signals are indicative of the obstacle, is further configured to determine whether the event signals are indicative of vehicle events not within a set of defined events associated with traversal of the path.

9. A computer-implemented method for autonomous vehicle operation, the method comprising:
  receiving, by a computing system, a plurality of event signals from at least a first autonomous vehicle that is traversing a path;
  determining, by the computing system, whether the event signals are indicative of an obstacle at least partially blocking the path the first autonomous vehicle;
  receiving, by the computing system from at least a second autonomous vehicle, at least one characteristic of the obstacle captured by at least one sensor of the second autonomous vehicle;
  determining, by the computing system and based on the characteristic of the obstacle, at least one task to clear the obstacle from the portion of the path, wherein the computer system is further configured to compare the characteristic of the obstacle to a characteristic of a known obstacle;
  identifying, by the computing system, based on the characteristic of the obstacle, a third autonomous vehicle having a container that is capable of clearing the obstacle; and
  deploying, by the computing system, at least the third autonomous vehicle to complete the at least one task, wherein the at least one task is included in a task list for the third autonomous vehicle.

10. The method of claim 9, wherein the at least one task is transmitted to a controller of the third autonomous vehicle, and further comprising:
  navigating, by the controller in response to receiving the at least one task, the third autonomous vehicle to the portion of the path to clear the obstacle according to the at least one task.

11. The method of claim 9, further comprising:
  receiving, by the computing system, a signal that the obstacle is cleared from the path.

12. The method of claim 9, wherein the plurality of event signals indicate at least one of:
  (i) decreased speed of the first autonomous vehicle while traversing the path;
  (ii) increased congestion of vehicles or humans in the path;
  (iii) deviation of the first autonomous vehicle from the path; or
  (iv) collision with the obstacle.

13. The method of claim 9, wherein the at least one sensor comprises at least one of a camera, a LiDAR sensor, or a depth sensor.

14. The method of claim 9, wherein the at least one characteristic of the obstacle comprises at least one of a size of the obstacle, a shape of the obstacle, a weight of the obstacle, or a type of the obstacle.

15. The method of claim 9, wherein at least two of the group consisting of the first autonomous vehicle, the second autonomous vehicle, and the third autonomous vehicle are a same autonomous vehicle.

16. The method of claim 9, wherein determining whether the event signals are indicative of the obstacle comprises:
  determining whether the event signals are indicative of vehicle events not within a set of defined events associated with traversal of the path.

17. A non-transitory computer-readable medium having instructions stored thereon that, when executed by one or more computer processors, cause the one or more computer processors to perform operations comprising:
  receiving a plurality of event signals from at least a first autonomous vehicle that is traversing a path;
  determining whether the event signals are indicative of an obstacle at least partially blocking the path of the first autonomous vehicle;
  receiving, from at least a second autonomous vehicle, at least one characteristic of the obstacle captured by at least one sensor of the second autonomous vehicle;
  determining, based on the characteristic of the obstacle, at least one task to clear the obstacle from the portion of the path, wherein the one or more computer processors are further configured to compare the characteristic of the obstacle to a characteristic of a known obstacle;
  identifying, based on the characteristic of the obstacle, a third autonomous vehicle having a container that is capable of clearing the obstacle; and
  deploying at least the third autonomous vehicle to complete the at least one task, wherein the at least one task is included in a task list for the third autonomous vehicle.

* * * * *